United States Patent
Wang

(10) Patent No.: US 12,367,657 B2
(45) Date of Patent: Jul. 22, 2025

(54) TARGET DETECTION METHOD AND APPARATUS, AND STORAGE MEDIUM AND ELECTRONIC DEVICE

(71) Applicant: BOE Technology Group Co., Ltd., Beijing (CN)

(72) Inventor: Zilu Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 423 days.

(21) Appl. No.: 17/798,080

(22) PCT Filed: Aug. 20, 2021

(86) PCT No.: PCT/CN2021/113675
§ 371 (c)(1),
(2) Date: Aug. 8, 2022

(87) PCT Pub. No.: WO2022/052785
PCT Pub. Date: Mar. 17, 2022

(65) Prior Publication Data
US 2023/0154156 A1    May 18, 2023

(30) Foreign Application Priority Data

Sep. 8, 2020    (CN) .......................... 202010933809

(51) Int. Cl.
| | | |
|---|---|---|
| *G06V 10/77* | (2022.01) | |
| *G06V 10/82* | (2022.01) | |
| *G06V 40/16* | (2022.01) | |

(52) U.S. Cl.
CPC .......... *G06V 10/7715* (2022.01); *G06V 10/82* (2022.01); *G06V 40/168* (2022.01)

(58) Field of Classification Search
CPC .. G06V 10/7715; G06V 10/82; G06V 40/168; G06V 10/454; G06V 20/52; G06V 40/16; G06N 3/04; G06N 3/045; G06F 18/24
See application file for complete search history.

(56) References Cited

FOREIGN PATENT DOCUMENTS

| | | | | |
|---|---|---|---|---|
| CN | 106815574 A | * | 6/2017 | |
| CN | 109872362 A | * | 6/2019 | |
| CN | 111598149 A | * | 8/2020 | ........... G06F 18/253 |

* cited by examiner

*Primary Examiner* — Huo Long Chen
(74) *Attorney, Agent, or Firm* — XSENSUS LLP

(57) ABSTRACT

A target detection method and apparatus, a computer-readable storage medium, and an electronic device. The method comprises: acquiring an input image, and performing feature extraction on the input image by means of a first convolutional layer and a second convolutional layer to obtain a reference feature image (S110); performing feature extraction on the reference feature image by means of a third convolutional layer to obtain a first target feature image, and performing feature extraction on the first target feature image by means of a fourth convolutional layer to obtain a second target feature image (S120); acquiring a reference pre-selected image of each point on the first target feature image and the second target feature image (S130); and determining a target pre-selected image from among a plurality of reference pre-selected images, and completing target detection by means of a target detection algorithm (S140).

20 Claims, 5 Drawing Sheets

TARGET DETECTION METHOD AND APPARATUS, AND STORAGE MEDIUM AND ELECTRONIC DEVICE

CROSS REFERENCE

The present application is based upon International Application No. PCT/CN2021/113675, filed on Aug. 20, 2021, which is based upon and claims priority to Chinese Patent Application No. 202010933809.5, filed on Sep. 8, 2020 and entitled "TARGET DETECTION METHOD AND APPARATUS, AND STORAGE MEDIUM AND ELECTRONIC DEVICE", and the entire contents thereof are incorporated herein by reference.

TECHNICAL FIELD

The present disclosure relates to the technical field of image processing, and in particular, to a target detection method and apparatus, a computer-readable storage medium, and an electronic device.

BACKGROUND

The application of deep learning algorithms in the field of face detection has been quite mature, but in the application of passenger flow statistics, not every customer's face is facing directly to the camera. In order to correctly detect the number of people, head features should be extracted to detect the number of people's head in the video, so as to achieve the purpose of passenger flow statistics.

It should be noted that, information disclosed in the above background portion is provided only for better understanding of the background of the present disclosure, and thus it may contain information that does not form the prior art known by those ordinary skilled in the art.

SUMMARY

According to a first aspect, the present disclosure provides a target detection method, including:
  obtaining an input image, and performing feature extraction on the input image using a first convolution layer and a second convolution layer, to obtain a reference feature image;
  performing feature extraction on the reference feature image using a third convolution layer to obtain a first target feature image, and performing feature extraction on the first target feature image using a fourth convolution layer to obtain a second target feature image;
  obtaining a reference preselected image of each point on the first target feature image and the second target feature image; and
  determining a target preselected image from a plurality of the reference preselected image, and detecting the target according to a target detection algorithm,
  wherein the first convolution layer and the second convolution layer are both single-module residual convolution layers, and the third convolution layer and the fourth convolution layer are double-module residual convolution layers.

In one exemplary embodiment of the present disclosure, the performing feature extraction on the input image using the first convolution layer and the second convolution layer to obtain the reference feature image includes:
  performing feature extraction on the input image using the first convolution layer to obtain an initial feature image; and
  performing feature extraction on the initial feature image using the second convolution layer to obtain the reference feature image.

In one exemplary embodiment of the present disclosure, the single-module residual convolution layer includes:
  a first convolution unit, including a serially designed depthwise separable convolution kernel and a first convolution kernel; and
  a residual network unit, including a serially designed max-pooling subunit and a padding subunit,
  wherein the first convolution kernel is a standard convolution kernel.

In one exemplary embodiment of the present disclosure, the performing feature extraction on the input image using the first convolution layer to obtain the initial feature image includes:
  inputting the input image into the first convolution unit of the first convolution layer to perform feature extraction to obtain a first feature image;
  inputting the input image into the residual network unit of the first convolutional layer to obtain a second feature image same in format with the first feature image; and
  adding the first feature image and the second feature image to obtain the initial feature image.

In one exemplary embodiment of the present disclosure, the performing feature extraction on the initial feature image using the second convolution layer to obtain the reference feature image includes:
  inputting the initial feature image into the first convolution unit of the second convolution layer to perform feature extraction to obtain a third feature image;
  inputting the initial feature image into the residual network unit of the second convolution layer to obtain a fourth feature image same in format with the third feature image; and
  adding the third feature image and the fourth feature image to obtain the reference feature image.

In one exemplary embodiment of the present disclosure, the double-module residual convolution layer includes:
  a second convolution unit, including a serially designed depthwise separable convolution kernel and a second convolution kernel;
  a third convolution unit, serially connected to the second convolution unit and including a serially designed depthwise separable convolution kernel and a third convolution kernel; and
  a residual network unit, including a serially designed max-pooling subunit and a padding subunit.

In one exemplary embodiment of the present disclosure, the performing feature extraction on the reference feature image using the third convolution layer to obtain the first target feature image includes:
  performing feature extraction on the reference feature image using the second convolution unit and the third convolution unit of the third convolution layer to obtain a fifth feature image;
  inputting the reference feature image into the residual network unit of the third convolution layer to obtain a sixth feature image same in format with the fifth feature image; and
  adding the fifth feature image and the sixth feature image to obtain the first target feature image.

In one exemplary embodiment of the present disclosure, performing feature extraction on the first target feature image using the fourth convolution layer to obtain the second target feature image includes:
  performing feature extraction on the first target feature image using the second convolution unit and the third convolution unit of the fourth convolution layer to obtain a seventh feature image;
  inputting the first target feature image into the residual network unit of the fourth convolution layer to obtain an eighth feature image same in format with the seventh feature image; and
  adding the seventh feature image and the eighth feature image to obtain the second target feature image.

In one exemplary embodiment of the present disclosure, the obtaining the reference preselected image of each point on the first target feature image and the second target feature image includes:
  generating at least one reference preselected image based on each point with each point of the first target feature image and the second target feature image as a center.

In one exemplary embodiment of the present disclosure, the determining the target preselected image from a plurality of the reference preselected image, and detecting the target according to the target detection algorithm includes:
  performing category regression on features of all reference preselected images respectively, and calculate a category score of each category;
  selecting the target preselected image according to the category score; and
  detecting the target by performing non-maximum suppression operation on the target preselected image.

According to one aspect, the present disclosure provides an apparatus for detecting a target, including:
  an image obtaining module, configured to obtain an input image, and perform feature extraction on the input image using a first convolution layer and a second convolution layer, to obtain a reference feature image;
  a feature extracting module, configured to perform feature extraction on the reference feature image using a third convolution layer to obtain a first target feature image, and perform feature extraction on the first target feature image using a fourth convolution layer to obtain a second target feature image;
  an image selecting module, configured to obtain a reference preselected image of each point on the first target feature image and the second target feature image; and
  an image determining module, configured to determine a target preselected image from a plurality of the reference preselected image, and detect the target according to a target detection algorithm,
  wherein the first convolution layer and the second convolution layer are both single-module residual convolution layers, and the third convolution layer and the fourth convolution layer are double-module residual convolution layers.

According to one aspect, the present disclosure provides a computer-readable storage medium on which a computer program is stored, wherein when the program is executed by a processor, any one of the above methods for detecting the target is implemented.

According to one aspect, the present disclosure provides an electronic device, including:
  a processor; and
  a memory configured to store one or more programs, wherein when the one or more programs are executed by the processor, causes the processor to implement any one of the above methods for detecting the target.

It is to be understood that both the foregoing general description and the following detailed description are exemplary and explanatory only and are not restrictive of the invention, as claimed.

This section provides a summary of various implementations or examples of the technology described in the disclosure, and is not a comprehensive disclosure of the full scope or all features of the disclosed technology.

BRIEF DESCRIPTION OF THE DRAWINGS

The accompanying drawings, which are incorporated in and constitute a part of this specification, illustrate embodiments consistent with the disclosure and together with the description serve to explain the principles of the disclosure. Obviously, the drawings in the following description are only some embodiments of the present disclosure, and for those of ordinary skill in the art, other drawings can also be obtained from these drawings without creative effort. In the drawings.

DETAILED DESCRIPTION

Figure 1:
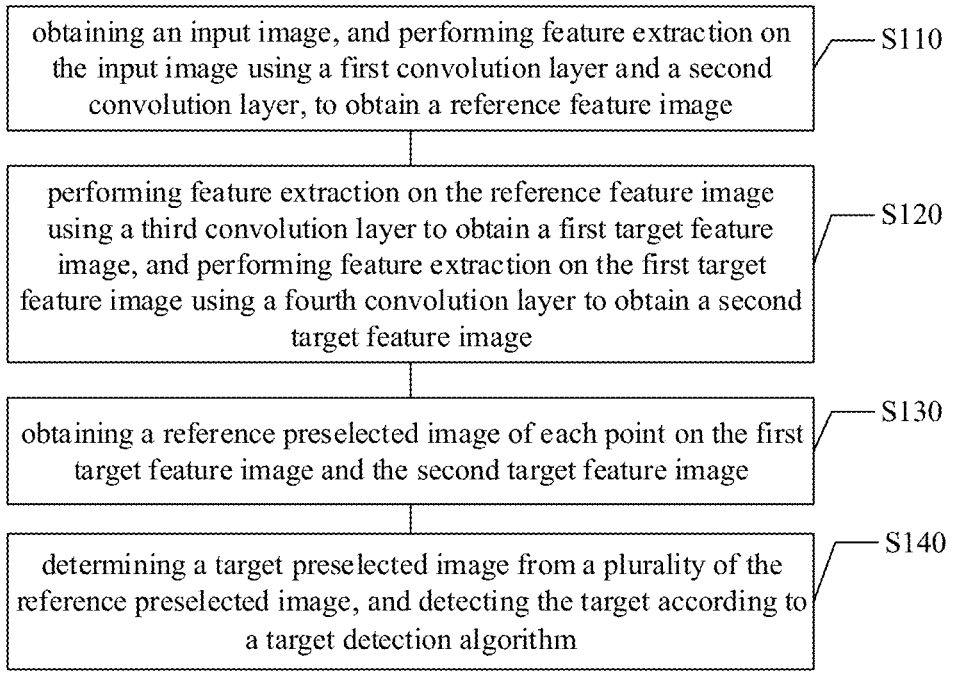
FIG. 1 schematically shows a flow chart of a target detection method in an exemplary embodiment of the present disclosure.

Example embodiments will now be described more fully with reference to the accompanying drawings. Example embodiments, however, can be embodied in various forms and should not be construed as limited to the examples set forth herein; rather, these embodiments are provided so that this disclosure will be thorough and complete, and will fully convey the concept of example embodiments to those skilled in the art. The described features, structures, or characteristics may be combined in any suitable manner in one or more embodiments.

Furthermore, the drawings are merely schematic illustrations of the present disclosure and are not necessarily drawn to scale. The same reference numerals in the drawings denote the same or similar parts, and thus their repeated descriptions will be omitted. Some of the block diagrams shown in the figures are functional entities that do not necessarily correspond to physically or logically separate entities. These functional entities may be implemented in software, or in one or more hardware modules or integrated circuits, or in different networks and/or processor devices and/or microcontroller devices.

In this exemplary embodiment, a target detection method is first provided. Referring to FIG. 1, the above target detection method may include the following steps:

S110, obtaining an input image, and performing feature extraction on the input image using a first convolution layer and a second convolution layer, to obtain a reference feature image;

S120, performing feature extraction on the reference feature image using a third convolution layer to obtain a first target feature image, and performing feature extraction on the first target feature image using a fourth convolution layer to obtain a second target feature image;

S130, obtaining a reference preselected image of each point on the first target feature image and the second target feature image; and S140, determining a target preselected image from a plurality of the reference preselected image, and detecting the target according to a target detection algorithm.

According to the target detection method provided in this exemplary embodiment, compared with the prior art, the first convolutional layer and the second convolutional layer are both single-module residual convolutional layers, and the third convolutional layer and the fourth convolutional layer are dual-module residual convolution layers, and the target pre-selected image is obtained through the above four convolution layers, which can increase the receptive field, and can complete target detection without adding convolution layers. The computational burden is reduced, the computational efficiency is accelerated, and the real-time performance of target detection is enhanced.

Hereinafter, each step of the target detection method in this exemplary embodiment will be described in more detail with reference to the accompanying drawings and embodiments.

In step S110, the input image is obtained, and feature extraction is performed on the input image using the first convolution layer and the second convolution layer, to obtain the reference feature image.

In an exemplary embodiment of the present disclosure, the input image may be a square image or a rectangular image, and then the first convolution layer and the second convolution layer may be used to perform feature extraction on the input image to obtain the reference feature image.

Figure 2:
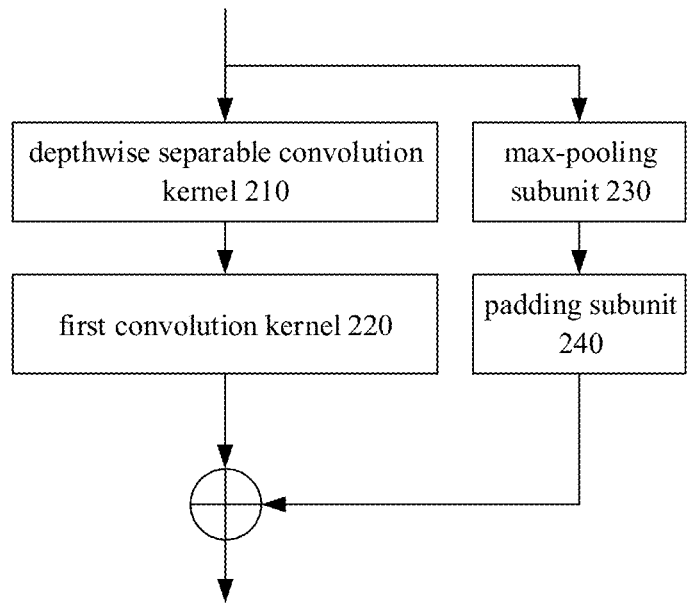
FIG. 2 schematically shows a schematic diagram of a single-module residual convolutional layer in an exemplary embodiment of the present disclosure.
Figure 4:
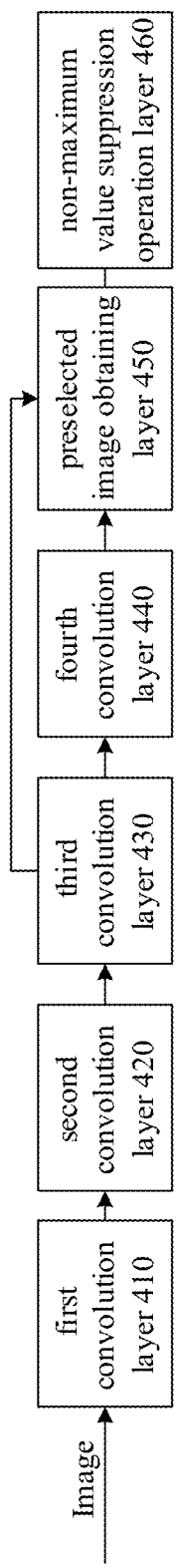
FIG. 4 schematically shows a frame diagram of the data flow of the target detection method in an exemplary embodiment of the present disclosure.

In this example embodiment, as shown in FIG. 2 and FIG. 4, the first convolutional layer 410 and the second convolutional layer 420 are both single-module residual convolutional layers. The single-module residual convolutional layer includes a first convolution unit and a residual network unit. The first convolution unit may include a serially designed depthwise separable convolution kernel 210 and a first convolution kernel 220, and the depthwise separable convolution kernel 210 may be a 5*5 sized depthwise separable convolution kernel 210. The size of the depthwise convolution kernel can be customized according to user requirements, e.g., a 6*6 sized depthwise separable convolution kernel 210, which is not specifically limited in this example implementation. The specific operation of the convolution kernel 210 is relatively mature in the related art, therefore, it will not be repeated here.

In this example embodiment, the first convolution kernel 220 may be a standard convolution kernel, and the first convolution kernel 220 may be a 1*1 standard convolution kernel in this embodiment.

In this exemplary embodiment, the residual network unit may include a serially designed max-pooling subunit 230 and a padding subunit 240, wherein the max-pooling subunit 230 divides the input image into several rectangular regions, and for each sub-region outputs the maximum value, that is, it is used to perform a max-pooling operation on the above-mentioned input images. The max-pooling operation is relatively mature in the related art, so it will not be repeated here. The padding subunit 240 is used for padding the feature image obtained after max-pooling, that is, padding zeros, to adjust the size of the feature image after max-pooling.

In this exemplary embodiment, the input image may be first input into the first convolution unit of the first convolution layer 410 for feature extraction to obtain the first feature image, and then the input image may be input into the residual network unit of the first convolution layer 410, after the above-mentioned max-pooling operation and padding operation, a second feature image with the same format as the first feature image can be obtained. The padding operation can make the second feature image have the same matrix format as the first feature image, so the initial feature image can be obtained by directly performing matrix adding of the first feature image and the second feature image.

After the above-mentioned initial feature image is obtained, the initial feature image can be input into the first convolution unit of the second convolution layer 420 for feature extraction to obtain the third feature image, and then the initial feature image can be input into the residual network unit of the second convolution layer 420 to obtain the fourth feature image with the same format as the third feature image after the above-mentioned max-pooling operation and padding operation. The padding operation can make the fourth feature image have the same matrix format as the third feature image, so the reference feature image can be obtained by directly performing matrix adding of the third feature image and the fourth feature image.

In step S210, the third convolution layer 430 is used to perform feature extraction on the reference feature image to obtain a first target feature image, and the fourth convolution layer 440 is used to perform feature extraction on the first target feature image to obtain a second target feature image.

Figure 3:
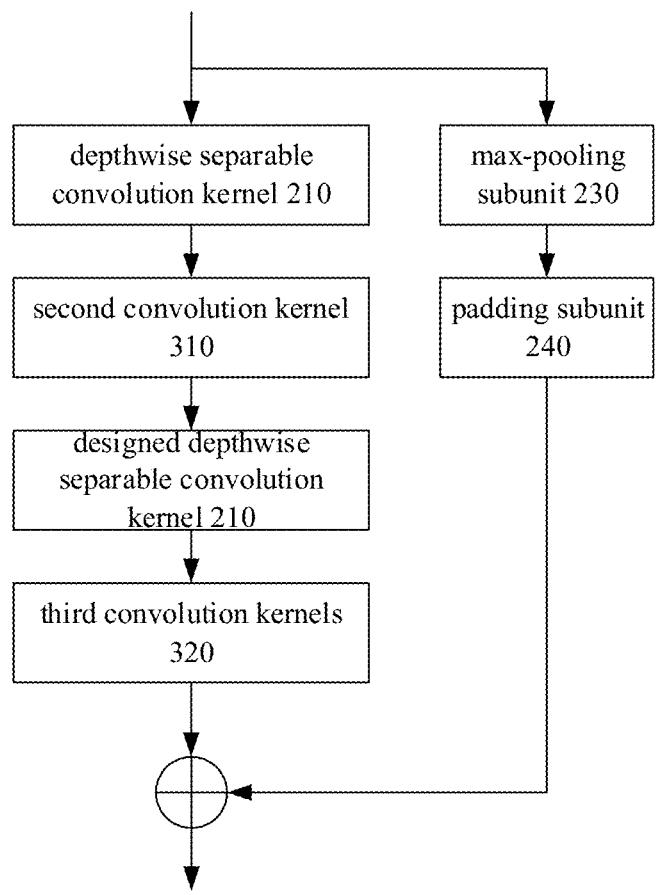
FIG. 3 schematically shows a schematic diagram of a dual-module residual convolutional layer in an exemplary embodiment of the present disclosure.

In an example implementation of the present disclosure, referring to FIGS. 3 and 4, the third convolution layer 430 and the fourth convolution layer 440 may be dual-module residual convolution layers, wherein the dual-module residual convolution layer may include a second convolutional unit, a third convolution unit and a residual network unit.

In this example embodiment, the second convolution unit may include a serially designed depthwise separable convolution kernel 210 and a second convolution kernel 310, wherein the second convolution kernel 310 may include a 1*1 standard convolution kernel, a normalization layer (BN layer) and an activation layer (relu layer), and the depthwise separable convolution kernel 210 may be a 5*5 depthwise separable convolution kernel 210. The size of the depthwise convolution kernel can be customized based on user requirements, e.g., a depthwise separable convolution kernel 210 with a size of 6*6, which is not specifically limited in this example implementation. Since the specific operation mode of the depthwise separable convolution kernel 210 is relatively mature in related technologies, therefore, it will not be repeated here.

The third convolution layer 430 may also include serially designed depthwise separable convolution kernels 210 and third convolution kernels 320, wherein the third convolution kernel 320 may include a 1*1 standard convolution kernel and a 3*3 standard convolution kernel. In this exemplary embodiment, the third convolution kernel 320 only includes the 1*1 standard convolution kernel therein. The depthwise separable convolution kernel has the same structure and function as the depthwise separable convolution kernels of the first convolution layer 410 and the second convolution layer 420, which have been described in detail above, and therefore will not be repeated here.

In this exemplary embodiment, the residual network unit may include a serially designed max-pooling subunit 230 and a padding subunit 240, wherein the max-pooling subunit 230 divides the input image into several rectangular regions, and for each sub-region outputs the maximum value, that is, it is used to perform a max-pooling operation on the above-mentioned input images. The max-pooling operation is relatively mature in the related art, so it will not be repeated here. The padding subunit 240 is used for padding the feature image obtained after max-pooling, that is, padding zeros, to adjust the size of the feature image after max-pooling.

In this exemplary embodiment, the second convolution unit and the third convolution unit of the third convolution layer 430 may be used to perform feature extraction on the reference feature image to obtain a fifth feature image, and the reference image may be input to the residual network unit of the third convolution layer 430 to obtain a sixth feature image with the same format as the fifth feature image. After the above-mentioned max-pooling operation and padding operation, the sixth feature image with the same format as the fifth feature image can be obtained. The padding operation can make the sixth feature image have the same matrix format as the fifth feature image, so the first target feature image can be obtained by directly performing matrix adding of the fifth feature image and the sixth feature image.

After the above-mentioned first target feature image is obtained, the second convolution unit and the third convolution unit of the fourth convolution layer 440 may be used to perform feature extraction on the first target feature image to obtain a seventh feature image, and then the first target feature image may be input to the residual network unit of the fourth convolution layer 440 to obtain an eighth feature image with the same format as the seventh feature image. After the above-mentioned max-pooling operation and padding operation, the eighth feature image with the same format as the seventh feature image can be obtained. The padding operation can make the eighth feature image have the same matrix format as the seventh feature image, so the second target feature image can be obtained by directly performing matrix adding of the seventh feature image and the eighth feature image.

In this example implementation, there may be a plurality of first target feature images, that is, the third convolution layer performs dimensionality reduction processing on the above reference images to obtain many first target feature images. Similarly, the fourth convolution layer also performs dimensionality reduction processing on multiple first target feature images, to obtain a large number of second target feature images, thereby obtaining a large number of reference preselected images, and improving the accuracy of target detection.

In step S130, a reference preselected image of each point on the first target feature image and the second target feature image is acquired.

In an exemplary embodiment of the present disclosure, a reference preselected image of each point in the first target feature image and the second target feature image may be obtained, specifically, with each point on the first target image and the second target feature image as a center, at least one reference preselected image is generated based on each point.

In this exemplary embodiment, the number of the first target image and the second target image can be multiple, and the size of the first target feature image and the second target feature image are different. The corresponding reference preselected image can be obtained at the feature image of various sizes, which may improve the accuracy of target detection.

In this exemplary embodiment, there may be multiple reference preselected images for each point, and the above-mentioned reference preselected images may be used to form a set of reference preselected images for this point.

In the present exemplary embodiment, referring to FIG. 4, both the above-mentioned first target feature image and second target feature image may be input to a preselected image obtaining layer 450. For each reference preselected image in the "k" reference preselected image sets of each position in the first target feature image and second target feature image, "c" categories and score of each category are required to be calculated, and also 4 offsets of the reference preselected image with respect to its default reference preselected image can be calculated. Accordingly, for each feature image of the first target feature image and second target feature image, "(c+4)×k" filters are required. Accordingly, if one feature image includes m×n points, "(c+4)×k× m×n" reference preselected images are generated based on the feature image. The above offset may be 0.5, or may also be customized according to requirements, which is not specifically limited in this example implementation.

In step S140, a target preselected image is determined from the plurality of the reference preselected images, and a target detection algorithm is used to complete the target detection.

In an exemplary embodiment of the present disclosure, category regression may be performed on the features of all reference preselected images, respectively, and the category score of each category may be calculated.

In this exemplary embodiment, based on target detection, the detection target of the target detection method in this scheme can be a human head, a face, etc. The following description is made by taking the detection target as a human head as an example, and the categories of the reference preselected images in this scheme can include background and human head. Therefore, in this example embodiment, the scores of the above-mentioned human head category and background category can be calculated. Afterwards, the reference preselected images with the human head category score less than a preset value can be eliminated, and the reference preselected image with the human head category score equal to or greater than the preset value is selected as the target preselected image. The above-mentioned preset value may be set by a user, such as 0.01, 0.02, etc., which is not specifically limited in this exemplary implementation.

In this exemplary embodiment, the obtained multiple target preselection images may be input to the non-maximum value suppression operation layer 460, and NMS (Non Maximum Suppression) operation are performed according to the above mentioned human head category score in the target preselected image and the overlapped portion of the respective target preselected images, to obtain the final preselected image. The final preselected image can be used to complete the detection of the human head. The maximum threshold in the NMS operation can be set according to requirements, for example, 0.45, 0.5, etc., which is not specifically limited in this exemplary embodiment.

In summary, the present application can complete the detection of multiple heads through the above four convolutional layers without adding convolutional layers, which can reduce the computational burden, increase computational efficiency, and improve the real-time performance of target detection.

Figure 5:
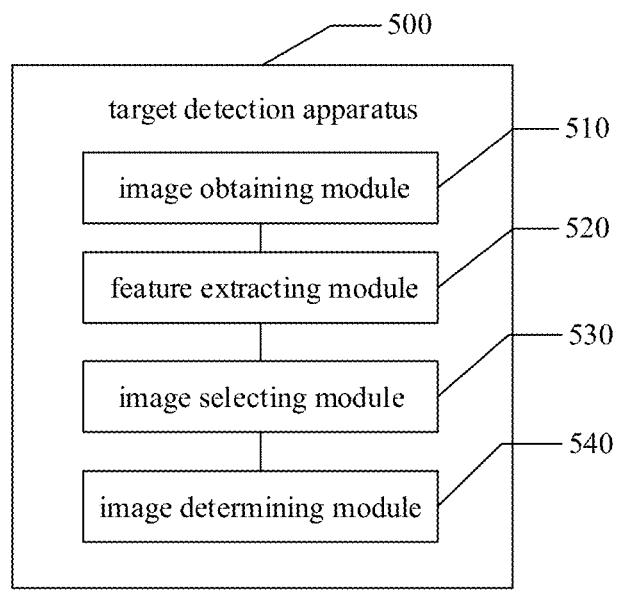
FIG. 5 schematically shows a schematic composition diagram of a target detection apparatus in an exemplary embodiment of the present disclosure.

The apparatus embodiments of the present disclosure are introduced below, which can be used to execute the above-mentioned target detection method of the present disclosure. In addition, in an exemplary embodiment of the present disclosure, a target detection apparatus is also provided. Referring to FIG. 5, the target detection apparatus 500 includes: an image obtaining module 510, a feature extracting module 520, an image selecting module 530, and an image determining module 540.

In the embodiment, the image obtaining module 510 may be configured to obtain an input image, and perform feature extraction on the input image using the first convolution layer 410 and the second convolution layer 420, to obtain a reference feature image; the feature extracting module 520 may be configured to perform feature extraction on the reference feature image using the third convolution layer 430 to obtain a first target feature image, and perform feature extraction on the first target feature image using the fourth convolution layer 440 to obtain a second target feature image; the image selecting module 530 may be configured to obtain a reference preselected image of each point on the first target feature image and the second target feature image; and the image determining module 540 may be configured to determine a target preselected image from a plurality of the reference preselected image, and detect the target according to a target detection algorithm.

Since each functional module of the target detection apparatus of the exemplary embodiment of the present disclosure corresponds to the steps of the above-mentioned exemplary embodiment of the target detection method, for details not disclosed in the embodiment of the apparatus of the present disclosure, please refer to the above-mentioned target detection method of the present disclosure example.

It should be noted that although several modules or units of the apparatus for action performance are mentioned in the above detailed description, this division is not mandatory. Indeed, according to embodiments of the present disclosure, the features and functions of two or more modules or units described above may be embodied in one module or unit. Conversely, the features and functions of one module or unit described above may be further divided into multiple modules or units to be embodied.

In addition, in an exemplary embodiment of the present disclosure, an electronic device capable of realizing the above target detection is also provided.

As will be appreciated by one skilled in the art, various aspects of the present disclosure may be implemented as a system, method or program product. Therefore, various aspects of the present disclosure can be embodied in the following forms, namely: a complete hardware embodiment, a complete software embodiment (including firmware, microcode, etc.), or a combination of hardware and software aspects, which may be collectively referred to herein as a "circuit", "module" or "system".

An electronic device 600 according to such an embodiment of the present disclosure is described below with reference to FIG. 6. The electronic device 600 shown in FIG. 6 is only an example, and should not impose any limitation on the function and scope of use of the embodiments of the present disclosure.

Figure 6:
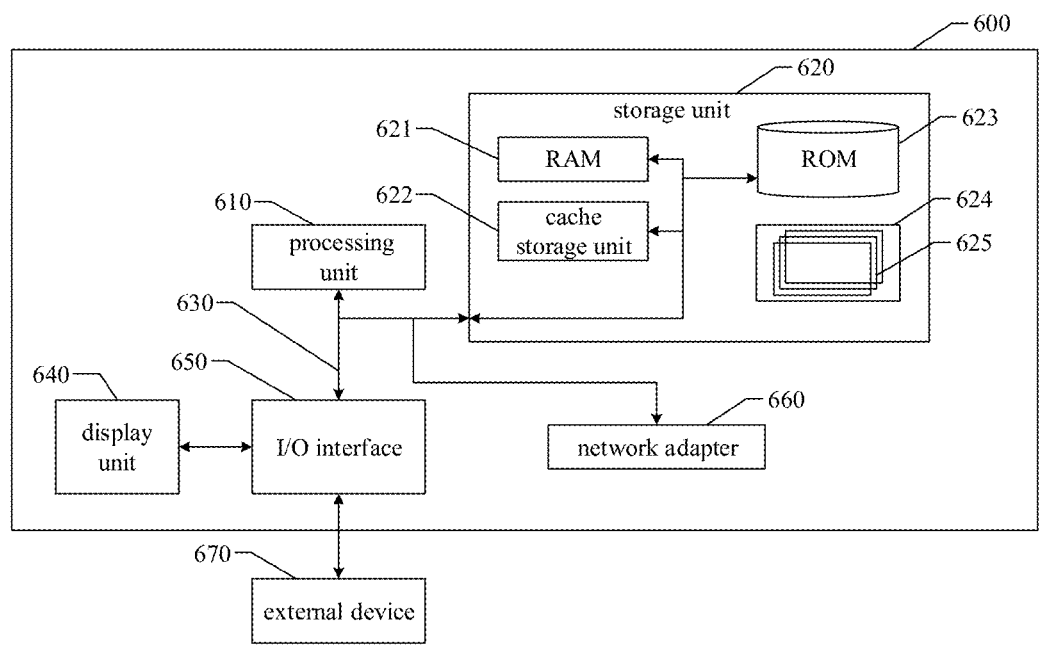
FIG. 6 schematically shows a schematic structural diagram of a computer system suitable for implementing an electronic device according to an exemplary embodiment of the present disclosure.

As shown in FIG. 6, the electronic device 600 takes the form of a general-purpose computing device. Components of the electronic device 600 may include, but are not limited to: the above-mentioned at least one processing unit 610, the above-mentioned at least one storage unit 620, a bus 630 connecting different system components (including the storage unit 620 and the processing unit 610), and a display unit 640.

The storage unit stores program codes, and the program codes can be executed by the processing unit 610, so that the processing unit 610 executes steps of various exemplary methods according to the present disclosure described in the above-mentioned "Exemplary Methods" section of this specification. For example, the processing unit 610 may perform step as shown in FIG. 1: S110, obtaining an input image, and performing feature extraction on the input image using the first convolution layer 410 and the second convolution layer 420, to obtain a reference feature image; S120, performing feature extraction on the reference feature image using the third convolution layer 430 to obtain a first target feature image, and performing feature extraction on the first target feature image using the fourth convolution layer 440 to obtain a second target feature image; S130, obtaining a reference preselected image of each point on the first target feature image and the second target feature image; and S140, determining a target preselected image from a plurality of the reference preselected image, and detecting the target according to a target detection algorithm. The first convolutional layer 410 and the second convolutional layer 420 are both single-module residual convolutional layers, and the third convolutional layer 430 and the fourth convolutional layer 440 are dual-module residual convolutional layers.

The storage unit 620 may include a readable medium in the form of a volatile storage unit, such as a random access storage unit (RAM) 621 and/or a cache storage unit 622, and may further include a read only storage unit (ROM) 623.

The storage unit 620 may also include a program/utility 624 having a set (at least one) of program modules 625 including, but not limited to, an operating system, one or more application programs, other program modules, and program data. Each or some combination of these examples may include implementation of a network environment.

The bus 630 may be representative of one or more of several types of bus structures, including a memory cell bus or memory cell controller, a peripheral bus, a graphics acceleration port, a processing unit, or a local area bus using any of a variety of bus structures.

The electronic device 600 may also communicate with one or more external devices 670 (e.g., keyboards, pointing devices, Bluetooth devices, etc.), may also communicate with one or more devices that enable a user to interact with the electronic device 600, and/or may also communicate with any device (e.g., router, modem, etc.) that enables the electronic device 600 to communicate with one or more other computing devices. Such communication may occur through input/output (I/O) interface 650. Also, the electronic device 600 may communicate with one or more networks (e.g., a local area network (LAN), a wide area network (WAN), and/or a public network such as the Internet) through a network adapter 660. As shown, network adapter 660 communicates with other modules of electronic device 600 via bus 630. It should be understood that, although not shown, other hardware and/or software modules may be used in conjunction with electronic device 600, including but not limited to: microcode, device drivers, redundant processing units, external disk drive arrays, RAID systems, tape drives and data backup storage systems.

From the description of the above embodiments, those skilled in the art can easily understand that the exemplary embodiments described herein may be implemented by software, or may be implemented by software combined with necessary hardware. Therefore, the technical solutions according to the embodiments of the present disclosure may be embodied in the form of software products, and the software products may be stored in a non-volatile storage medium (which may be CD-ROM, U disk, mobile hard disk, etc.) or on the network, including several instructions to cause a computing device (which may be a personal computer, a server, a terminal device, or a network device, etc.) to execute the method according to an embodiment of the present disclosure.

In an exemplary embodiment of the present disclosure, there is also provided a computer-readable storage medium on which a program product capable of implementing the above-described method of the present specification is stored. In some possible embodiments, various aspects of the present disclosure may also be implemented in the form of a program product including program code, and when the program product is executed on the terminal device, the program code is used for causing the terminal device to perform the steps according to various exemplary embodiments of the present disclosure described in the above-mentioned "Example Method" section of this specification.

Figure 7:
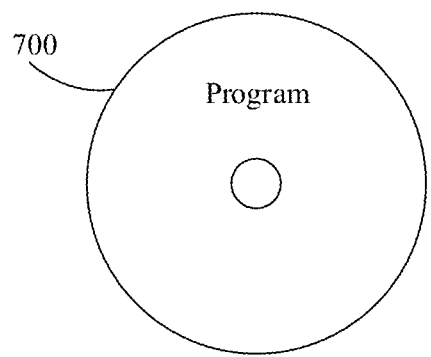
FIG. 7 schematically illustrates a schematic diagram of a computer-readable storage medium according to some embodiments of the present disclosure.

Referring to FIG. 7, a program product 700 for implementing the above method is described according to an embodiment of the present disclosure, which may be a portable compact disc read only memory (CD-ROM) and include program code, and may be executed on a terminal device, such as a personal computer. However, the program product of the present disclosure is not limited thereto, and in this disclosure, the readable storage medium may be any tangible medium that contains or stores a program that can be used by or in conjunction with an instruction execution system, apparatus, or device.

The program product may employ any combination of one or more readable media. The readable medium may be a readable signal medium or a readable storage medium. The readable storage medium may be, for example, but not limited to, an electrical, magnetic, optical, electromagnetic, infrared, or semiconductor system, apparatus or device, or a combination of any of the above. More specific examples (non-exhaustive list) of readable storage media include: electrical connections with one or more wires, portable disks, hard disks, random access memory (RAM), read only memory (ROM), erasable programmable read only memory (EPROM or flash memory), optical fiber, portable compact disk read only memory (CD-ROM), optical storage devices, magnetic storage devices, or any suitable combination of the above.

A computer readable signal medium may include a propagated data signal in baseband or as part of a carrier wave with readable program code embodied thereon. Such propagated data signals may take a variety of forms, including but not limited to electromagnetic signals, optical signals, or any suitable combination of the foregoing. A readable signal medium can also be any readable medium other than the readable storage medium that can transmit, propagate, or transport the program for use by or in connection with the instruction execution system, apparatus, or device.

Program code embodied on the readable medium may be transmitted using any suitable medium, including but not limited to wireless, wired, optical fiber cable, RF, etc., or any suitable combination of the foregoing.

Program code for performing the operations of the present disclosure may be written in any combination of one or more programming languages, including object-oriented programming languages—such as Java, C++, etc., as well as conventional procedural programming language—such as the "C" language or similar programming language. The program code may execute entirely on the user's computing device, partly on the user's device, as a stand-alone software package, partly on the user's computing device and partly on a remote computing device, or entirely on the remote computing device or server. Where remote computing devices are involved, the remote computing devices may be connected to the user computing device over any kind of network, including a local area network (LAN) or wide area network (WAN), or may be connected to an external computing device (e.g., using an Internet service provider via an Internet connection).

In addition, the above-mentioned figures are merely schematic illustrations of the processes included in the methods according to the exemplary embodiments of the present disclosure, and are not intended to be limiting. It is easy to understand that the processes shown in the above figures do not indicate or limit the chronological order of these processes. In addition, it is also readily understood that these processes may be performed synchronously or asynchronously, for example, in multiple modules.

Other embodiments of the present disclosure will be readily conceived to those skilled in the art upon consideration of the specification and practice of the invention disclosed herein. This disclosure is intended to cover any variations, uses, or adaptations of this disclosure that follow the general principles of this disclosure and include common general knowledge or techniques in the technical field not disclosed by this disclosure. The specification and examples are to be regarded as exemplary only, with the true scope and spirit of the disclosure being indicated by the claims.

It is to be understood that the present disclosure is not limited to the precise structures described above and illustrated in the accompanying drawings, and that various modifications and changes may be made without departing from the scope thereof. The scope of the present disclosure is limited only by the appended claims.

What is claimed is:

1. A method for detecting a target, comprising:
   obtaining an input image, and performing feature extraction on the input image using a first convolution layer and a second convolution layer, to obtain a reference feature image;
   performing feature extraction on the reference feature image using a third convolution layer to obtain a first target feature image, and performing feature extraction on the first target feature image using a fourth convolution layer to obtain a second target feature image;
   obtaining a reference preselected image of each point on the first target feature image and the second target feature image; and
   determining a target preselected image from a plurality of the reference preselected image, and detecting the target according to a target detection algorithm,
   wherein the first convolution layer and the second convolution layer are both single-module residual convolution layers, and the third convolution layer and the fourth convolution layer are double-module residual convolution layers.

2. The method according to claim 1, wherein the performing feature extraction on the input image using the first convolution layer and the second convolution layer to obtain the reference feature image comprises:
performing feature extraction on the input image using the first convolution layer to obtain an initial feature image; and
performing feature extraction on the initial feature image using the second convolution layer to obtain the reference feature image.

3. The method according to claim 2, wherein the single-module residual convolution layer comprises:
a first convolution unit, comprising a serially designed depthwise separable convolution kernel and a first convolution kernel; and
a residual network unit, comprising a serially designed max-pooling subunit and a padding subunit,
wherein the first convolution kernel is a standard convolution kernel.

4. The method according to claim 3, wherein the performing feature extraction on the input image using the first convolution layer to obtain the initial feature image comprises:
inputting the input image into the first convolution unit of the first convolution layer to perform feature extraction to obtain a first feature image;
inputting the input image into the residual network unit of the first convolutional layer to obtain a second feature image same in format with the first feature image; and
adding the first feature image and the second feature image to obtain the initial feature image.

5. The method according to claim 4, wherein the performing feature extraction on the initial feature image using the second convolution layer to obtain the reference feature image comprises:
inputting the initial feature image into the first convolution unit of the second convolution layer to perform feature extraction to obtain a third feature image;
inputting the initial feature image into the residual network unit of the second convolution layer to obtain a fourth feature image same in format with the third feature image; and
adding the third feature image and the fourth feature image to obtain the reference feature image.

6. The method according to claim 1, wherein the double-module residual convolution layer comprises:
a second convolution unit, comprising a serially designed depthwise separable convolution kernel and a second convolution kernel;
a third convolution unit, serially connected to the second convolution unit and comprising a serially designed depthwise separable convolution kernel and a third convolution kernel; and
a residual network unit, comprising a serially designed max-pooling subunit and a padding subunit.

7. The method according to claim 6, wherein the performing feature extraction on the reference feature image using the third convolution layer to obtain the first target feature image comprises:
performing feature extraction on the reference feature image using the second convolution unit and the third convolution unit of the third convolution layer to obtain a fifth feature image;
inputting the reference feature image into the residual network unit of the third convolution layer to obtain a sixth feature image same in format with the fifth feature image; and
adding the fifth feature image and the sixth feature image to obtain the first target feature image.

8. The method according to claim 7, wherein the performing feature extraction on the first target feature image using the fourth convolution layer to obtain the second target feature image comprises:
performing feature extraction on the first target feature image using the second convolution unit and the third convolution unit of the fourth convolution layer to obtain a seventh feature image;
inputting the first target feature image into the residual network unit of the fourth convolution layer to obtain an eighth feature image same in format with the seventh feature image; and
adding the seventh feature image and the eighth feature image to obtain the second target feature image.

9. The method according to claim 1, wherein the obtaining the reference preselected image of each point on the first target feature image and the second target feature image comprises:
generating at least one reference preselected image based on each point with each point of the first target feature image and the second target feature image as a center.

10. The method according to claim 1, wherein the determining the target preselected image from a plurality of the reference preselected image, and detecting the target according to the target detection algorithm comprises:
performing category regression on features of all reference preselected images respectively, and calculate a category score of each category;
selecting the target preselected image according to the category score; and
detecting the target by performing non-maximum suppression operation on the target preselected image.

11. A non-volatile computer-readable storage medium on which a computer program is stored, wherein when the program is executed by a processor, the execution causes the processor to perform a method for detecting a target comprising:
obtaining an input image, and performing feature extraction on the input image using a first convolution layer and a second convolution layer, to obtain a reference feature image;
performing feature extraction on the reference feature image using a third convolution layer to obtain a first target feature image, and performing feature extraction on the first target feature image using a fourth convolution layer to obtain a second target feature image;
obtaining a reference preselected image of each point on the first target feature image and the second target feature image; and
determining a target preselected image from a plurality of the reference preselected image, and detecting the target according to a target detection algorithm,
wherein the first convolution layer and the second convolution layer are both single-module residual convolution layers, and the third convolution layer and the fourth convolution layer are double-module residual convolution layers.

12. An electronic device, comprising:
a processor; and
a memory configured to store one or more programs, wherein when the one or more programs are executed by the processor, causes the processor to perform a method for detecting a target comprising:

obtaining an input image, and performing feature extraction on the input image using a first convolution layer and a second convolution layer, to obtain a reference feature image;

performing feature extraction on the reference feature image using a third convolution layer to obtain a first target feature image, and performing feature extraction on the first target feature image using a fourth convolution layer to obtain a second target feature image;

obtaining a reference preselected image of each point on the first target feature image and the second target feature image; and determining a target preselected image from a plurality of the reference preselected image, and detecting the target according to a target detection algorithm, wherein the first convolution layer and the second convolution layer are both single-module residual convolution layers, and the third convolution layer and the fourth convolution layer are double-module residual convolution layers.

13. The electronic device according to claim 12, wherein the performing feature extraction on the input image using the first convolution layer and the second convolution layer to obtain the reference feature image comprises:

performing feature extraction on the input image using the first convolution layer to obtain an initial feature image; and performing feature extraction on the initial feature image using the second convolution layer to obtain the reference feature image.

14. The electronic device according to claim 13, wherein the single-module residual convolution layer comprises:

a first convolution unit, comprising a serially designed depthwise separable convolution kernel and a first convolution kernel; and a residual network unit, comprising a serially designed max-pooling subunit and a padding subunit, wherein the first convolution kernel is a standard convolution kernel.

15. The electronic device according to claim 14, wherein the performing feature extraction on the input image using the first convolution layer to obtain the initial feature image comprises:

inputting the input image into the first convolution unit of the first convolution layer to perform feature extraction to obtain a first feature image;

inputting the input image into the residual network unit of the first convolutional layer to obtain a second feature image same in format with the first feature image; and adding the first feature image and the second feature image to obtain the initial feature image.

16. The electronic device according to claim 15, wherein the performing feature extraction on the initial feature image using the second convolution layer to obtain the reference feature image comprises:

inputting the initial feature image into the first convolution unit of the second convolution layer to perform feature extraction to obtain a third feature image;

inputting the initial feature image into the residual network unit of the second convolution layer to obtain a fourth feature image same in format with the third feature image; and adding the third feature image and the fourth feature image to obtain the reference feature image.

17. The electronic device according to claim 12, wherein the double-module residual convolution layer comprises:

a second convolution unit, comprising a serially designed depthwise separable convolution kernel and a second convolution kernel;

a third convolution unit, serially connected to the second convolution unit and comprising a serially designed depthwise separable convolution kernel and a third convolution kernel; and a residual network unit, comprising a serially designed max-pooling subunit and a padding subunit.

18. The electronic device according to claim 17, wherein the performing feature extraction on the reference feature image using the third convolution layer to obtain the first target feature image comprises:

performing feature extraction on the reference feature image using the second convolution unit and the third convolution unit of the third convolution layer to obtain a fifth feature image;

inputting the reference feature image into the residual network unit of the third convolution layer to obtain a sixth feature image same in format with the fifth feature image; and adding the fifth feature image and the sixth feature image to obtain the first target feature image.

19. The electronic device according to claim 18, wherein the performing feature extraction on the first target feature image using the fourth convolution layer to obtain the second target feature image comprises:

performing feature extraction on the first target feature image using the second convolution unit and the third convolution unit of the fourth convolution layer to obtain a seventh feature image;

inputting the first target feature image into the residual network unit of the fourth convolution layer to obtain an eighth feature image same in format with the seventh feature image; and adding the seventh feature image and the eighth feature image to obtain the second target feature image.

20. The electronic device according to claim 12, wherein the obtaining the reference preselected image of each point on the first target feature image and the second target feature image comprises:

generating at least one reference preselected image based on each point with each point of the first target feature image and the second target feature image as a center.

* * * * *

UNITED STATES PATENT AND TRADEMARK OFFICE
CERTIFICATE OF CORRECTION

| | | |
|---|---|---|
| PATENT NO. | : 12,367,657 B2 | Page 1 of 1 |
| APPLICATION NO. | : 17/798080 | |
| DATED | : July 22, 2025 | |
| INVENTOR(S) | : Zilu Wang | |

It is certified that error appears in the above-identified patent and that said Letters Patent is hereby corrected as shown below:

On the Title Page

Item [30], "202010933809" should read --202010933809.5--

Signed and Sealed this
Ninth Day of December, 2025

John A. Squires
*Director of the United States Patent and Trademark Office*